United States Patent [19]

Billet

[11] Patent Number: 4,560,055
[45] Date of Patent: Dec. 24, 1985

[54] CLUTCH COVER ASSEMBLY WITH RETAINING LUGS FOR THE PRESSURE PLATE

[75] Inventor: René Billet, Lamorlaye, France
[73] Assignee: Valeo, Paris, France
[21] Appl. No.: 348,073
[22] Filed: Feb. 11, 1982
[30] Foreign Application Priority Data Feb. 16, 1981 [FR] France ................ 81 02958

[51] Int. Cl.[4] ............... F16D 13/69; F16D 13/71
[52] U.S. Cl. ................ 192/109 R; 192/70.18; 192/70.28
[58] Field of Search .......... 192/70.18, 70.28, 89 B, 192/109 R

[56] References Cited

U.S. PATENT DOCUMENTS

| | | | |
|---|---|---|---|
| 2,061,093 | 11/1936 | Tatter | 192/109 R |
| 2,073,146 | 3/1937 | Gardiner | 192/89 B X |
| 2,162,873 | 6/1939 | Wolfram | 192/70.28 X |
| 2,201,340 | 5/1940 | Hunt | 192/70.28 |
| 2,253,344 | 8/1941 | Nutt et al. | 192/70.18 |
| 2,277,610 | 3/1942 | Ruesenberg | 192/70.28 X |
| 3,489,256 | 1/1970 | Binder et al. | 192/70.18 X |
| 4,336,871 | 6/1982 | Billet | 192/89 B X |
| 4,362,230 | 12/1982 | Corral | 192/70.28 X |

FOREIGN PATENT DOCUMENTS

| | | | |
|---|---|---|---|
| 2906863 | 9/1980 | Fed. Rep. of Germany | |
| 2437525 | 4/1980 | France | |
| 533506 | 2/1941 | United Kingdom | 192/89 B |
| 2032017 | 4/1980 | United Kingdom | 192/89 B |

Primary Examiner—Rodney H. Bonck
Attorney, Agent, or Firm—Charles E. Brown; Charles A. Brown

[57] ABSTRACT

A clutch cover assembly is disclosed in which the cover has radial retaining lugs which cooperate with transverse shoulders on the pressure plate for limiting the axial travel relative to the cover. Slots which may receive the lugs are provided in the pressure plate and may comprise one or more axial and/or circumferential grooves in continuity with the transverse shoulders. The grooves may be formed in the peripheral edge of the main body of the pressure plate or in the axial bosses engageable with the axially acting spring or in radial bosses at the edge of the pressure plate.

4 Claims, 13 Drawing Figures

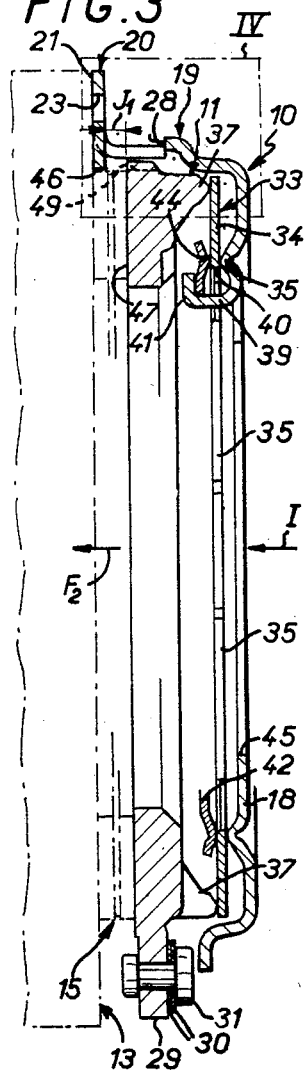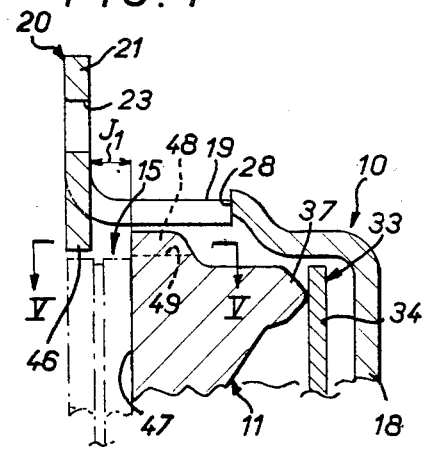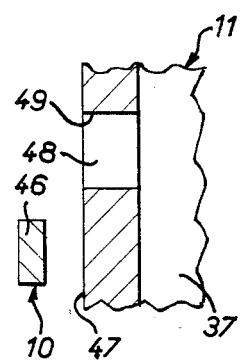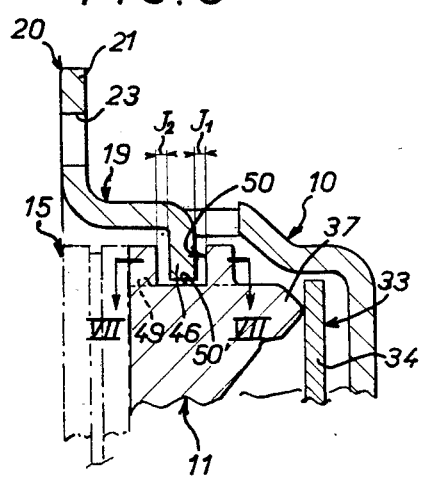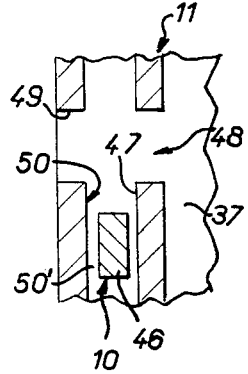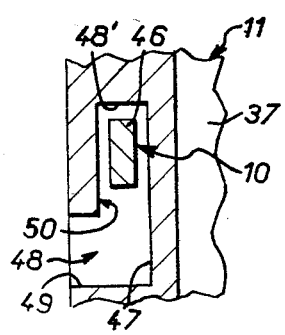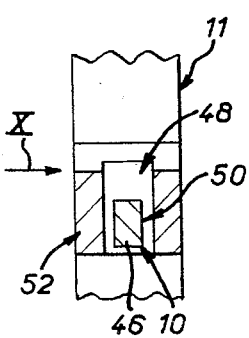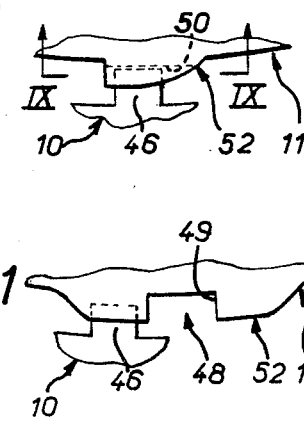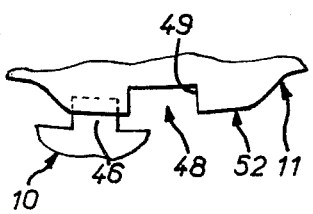

CLUTCH COVER ASSEMBLY WITH RETAINING LUGS FOR THE PRESSURE PLATE

BACKGROUND OF THE INVENTION

The present invention relates generally to automotive friction clutches, and more particularly to clutch cover assemblies which comprise a unitary assembly which is mounted on a reaction plate or flywheel after the insertion of a friction plate or driven disc therebetween to make up the clutch.

Generally speaking, such a clutch cover assembly comprises a plurality of generally annular members including a cover, a pressure plate connected for rotation with the cover by attachment means permitting limited axial displacement of the pressure plate relative to the cover. The cover assembly further comprises between the cover and the pressure plate axially acting resilient means bearing against the cover and applied against the pressure plate to urge the pressure plate axially away from the cover.

The present invention relates more particularly to the case where between the cover and the pressure plate are provided abutment means for axially retaining the pressure plate after predetermined axial travel relative to the cover. Indeed, it has been established that in at least certain applications it is desirable to limit the axial travel of the pressure plate against the axially acting resilient means. This is especially true when the attachment means attaching the pressure plate to the cover not only have the function of transmitting torque between the cover and the pressure plate while permitting axial displacement of the pressure plate relative to the cover, but also when they ensure the function of resiliently urging the pressure plate away from the associated clutch plate for clutch disengagement.

As is known the attachment means are usually formed by spring steel straps which are disposed generally transversely relative to the axis of the assembly or generally radially, and have a rather low axial stiffness.

Moreover, when cover assembly is unloaded, i.e., before mounting on the reaction plate or when handling the cover assembly on its own, the straps may be deformed to the detriment to their service life and/or effectiveness if measures are not taken to limit the axial displacement of the pressure plate relative to the cover under the action of the axially acting resilient means on the pressure plate, the latter not being in axial abutment.

In practice, when the axially acting resilient means comprise a diaphragm spring having a Belleville washer peripheral portion and a central portion divided into radial fingers for controlling the release of the peripheral portion, it is usual to provide along the inner periphery of the cover radial tabs. The radial fingers of the diaphragm spring come to bear against the inner periphery of the tabs on the cover which limits the resilient force applied to the pressure plate by the diaphragm and therefore the axial displacement of the pressure plate relative to the cover.

Yet, but in this situation, in the course of a handling the cover assembly without any particular precautions in its unloaded condition, owing to its substantial weight the pressure plate may be caused to swing sufficiently from the cover to cause a latent defect or damage to the straps attaching the pressure plate to the cover.

Consequently, it is common to provide with the pressure plate abutment means to ensure positive axial retention of the pressure plate to prevent axial displacement beyond a predetermined distance from the cover.

In French patent application No. 2,437,525, the retaining means provided for this purpose comprise retaining lugs formed from the cover, and a transverse shoulder on the pressure plate is adapted to abutment against each retaining lug. In this French patent publication for cooperation with the transverse shoulder formed by the outer surface of the pressure plate directed outwardly relative to the lateral wall of the cover, the retaining lugs extend circumferentially. Each of the retaining lugs is formed by a strike or cutout in the lateral part of the notches usually provided in such a cover for radial lugs on the pressure plate required for fixing to the pressure plate the straps connecting it to the cover.

The circumferentially extension of these retaining lugs has various drawbacks. First of all, there is necessarily a predetermined single direction of rotation depending on the direction of the extension of the retaining lugs whereby the cover assembly can only be used for a single direction of rotation. This direction of rotation corresponds to the straps operating in traction. For cover assemblies having a given direction of rotation covers must be used with retaining lugs extending circumferentially in the corresponding direction.

Further, the cutouts in the lateral part of the notches in the cover for the formation of the retaining lugs necessarily substantially locally weakens the cover.

Finally, the presence of such circumferential retaining lugs makes it is difficult to effect axial abutment in both directions of the pressure plate in order to protect the bending of the straps attaching the pressure plate to the cover, and/or circumferential abutment of the pressure plate to avoid straps buckling.

In DOS No. 2,906,863, the retaining lugs are formed from the cover for cooperation with the radially extending transverse shoulder on the pressure plate, but the pressure plate has on its inner periphery a transverse shoulder which at least in this embodiment is in continuity with a slot in the pressure plate.

There is a resulting relatively large radial distance between the circumference of the pressure plate on which the retaining lugs are disposed and the circumference of the pressure plate corresponding to the position at which the axially acting resilient means bear. The consequent lack of alignment makes the operation of the retaining lugs rather uncertain.

SUMMARY OF THE INVENTION

An object of the present invention is the provision of an arrangement which permits the foregoing drawbacks to be substantially diminished or overcome as well as providing other advantages.

The invention provides a clutch cover assembly for a motor vehicle of the type comprising a cover, a pressure plate connected for rotation with the cover by attachment means permitting limited axial displacement of the pressure plate relative to the cover. Axially acting resilient means bearing against the cover and applied against the pressure plate urge the pressure plate axially away from the cover. Abutment means axially retain the pressure plate after predetermined axial travel of the pressure plate relative to the cover. The retaining means comprises at least one radial retaining lug on the cover and a transverse shoulder on the pressure plate cooperable with the retaining lug, the shoulder extending in continuity with a slot in the pressure plate. The clutch cover assembly is characterized by the slot being provided along the outer peripheral edge of the pressure plate, whereby the axial abutment of the pressure plate with the retaining lug is situated along a circumference proximate to that of the circumference along which said axially acting resilient means is applied.

The term "outer peripheral edge of the pressure plate" designates in the present application the entire periphery of the pressure plate between the outer transverse surface of the pressure plate and the contact zone of the pressure plate with the axially acting resilient means.

In any event, with the arrangement according to the invention the lack of alignment or registration between the retaining lug on the cover and the axially acting resilient means is advantageously minimized, or even entirely eliminated, which contributes to better retention of the pressure plate. Moreover, with such an arrangement it is advantageously possible to utilize a single cover which is suitable for clutches rotating in either direction which obviously favors cost-saving standardization of parts.

Furthermore, since the retaining lug on the cover extends radially, it may be very simply formed from the lateral cylindrical or generally frustoconical part of the cover, which is usually eliminated for the formation of ventilation openings for ventilating the interior of the cover, and therefore without an additional or particular weakening of the cover.

In addition, the slot or slots provided according to the invention advantageously not insubstantially lighten the pressure plate and therefore reduce the moment of inertia without detriment to rigidity.

Moreover, at least for some embodiments the radial retention of the pressure plate is made possible by abutment at the end of the slot or slots at the end of the retaining lug or lugs on the cover.

Finally, for at least some embodiments in which such a slot or slots comprise an axial groove opening axially on the outer surface of the pressure plate, facing away from the cover, which is the face of the pressure plate cooperating with the clutch plate, such a slot or slots may contribute to eliminating dust which may develop thereon owing to the inevitable wear of the friction facings of the clutch plate in the course of use.

These and other features and advantages of the invention will be brought in the description which follows, given by way of example, with reference to the accompanying diagrammatic drawings.

BRIEF DESCRIPTION OF THE DRAWINGS

FIG. 3 is a longitudinal sectional view taken along line III—III in FIG. 1;

FIG. 4 shows, on enlarged scale, the area included within the phantom line box IV in FIG. 3;

FIG. 5 is a fragmentary circumferential view taken along line V—V in FIG. 4;

FIGS. 6 and 7 are views similar to FIGS. 4 and 5 respectively for an alternative embodiment;

FIG. 8 is a view similar to that of FIG. 7 concerning another alternative embodiment;

FIG. 9 is view similar to that of FIG. 7 for yet another embodiment;

FIG. 10 is a fragmentary elevational view of the embodiment of FIG. 9 taken in the direction of arrow X;

FIG. 11 is a view similar to that of FIG. 10 for still another alternative embodiment;

DETAILED DESCRIPTION OF THE PREFERRED EMBODIMENTS

Figure 1:
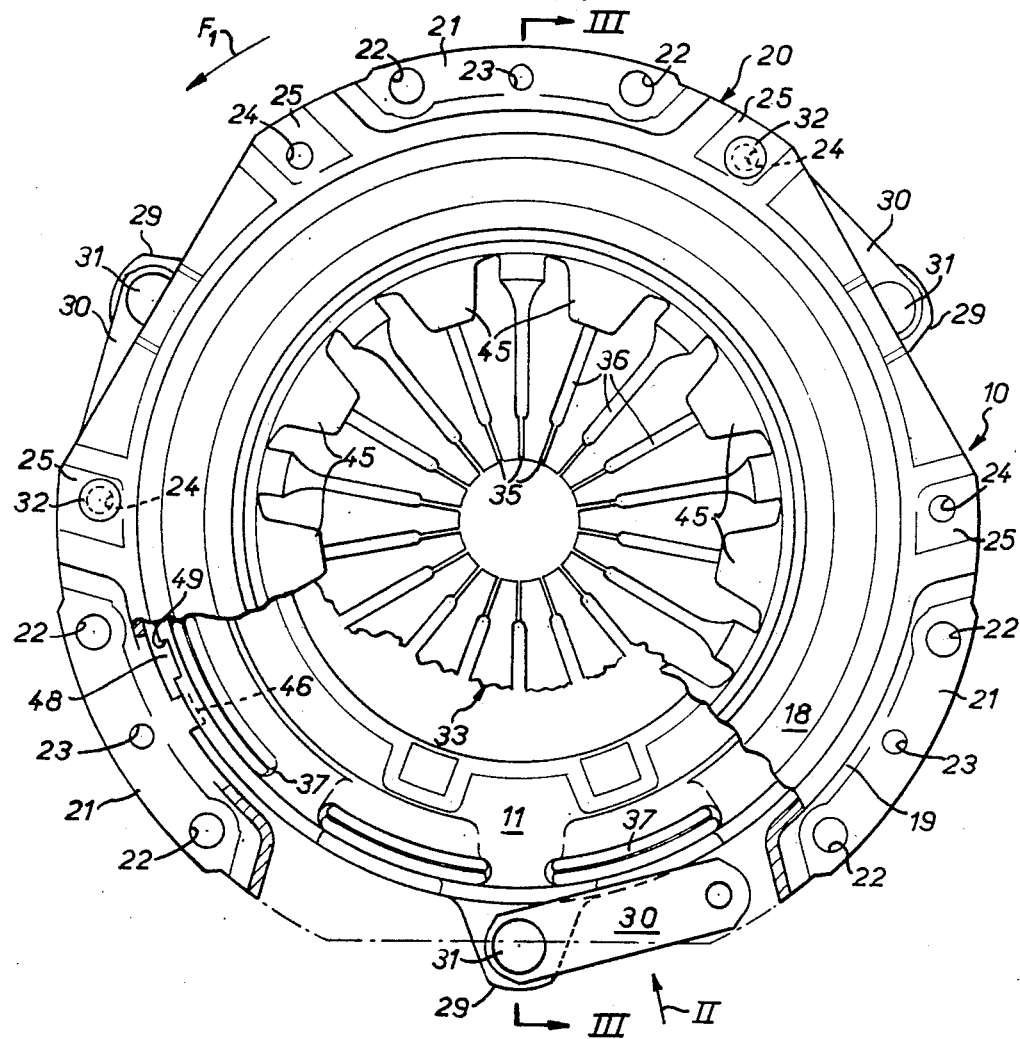
FIG. 1 shows a front elevational view, with a cutaway portion of a clutch cover assembly, taken in the direction of arrow I in FIG. 3.

Generally speaking, and as illustrated in the drawings the cover assembly comprises a series of annular parts including a cover 10, a pressure plate with axially acting resilient means formed as a diaphragm spring 33 described in detail hereinbelow, bearing against the cover 10 and urging the pressure plate 11 axially away from the cover.

Figure 2:
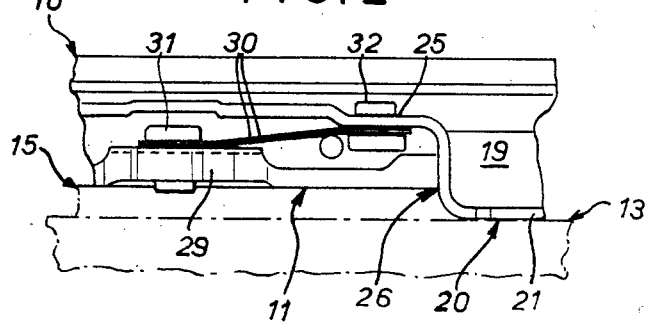
FIG. 2 shows a fragmentary side view taken in the direction of arrow II in FIG. 1.

As diagrammatically illustrated in phantom lines in FIGS. 2 and 3, the clutch cover assembly is adapted to be mounted by screws (not shown) on a reaction plate or flywheel 13, after insertion of a driven disc or clutch plate 15. The flywheel 13 is fixed for rotation with a first shaft (not shown), in practice the driving shaft, and the clutch plate 15 is fixed for rotation with a second shaft, in practice the driven shaft, likewise not shown.

In the embodiments of FIGS. 1-11 the reaction plate 13 is a flat reaction plate, in other words, it is devoid of any cylindrical lateral wall, the securement of the cover assembly to the reaction plate 13 is effected substantially in axial alignment with the surface of the reaction plate 13 against which the clutch plate 15 is applied.

In conjunction therewith the cover 10 of the cover assembly which has a transverse front wall 11 generally perpendicular to its axis against which the axially acting resilient means associated with the pressure plate 11 bear, also comprises a lateral wall 19 generally parallel to the axis for defining with the reaction plate 13 a space for accommodating the axially acting resilient means, the pressure plate 11 and the clutch plate 15.

The lateral wall 19 of the cover 10 at the end opposite the transverse wall 18 comprises a radially outwardly extending flange 20. The radial flange 20 forms generally two types of areas at two different axial locations. The areas 21 are three in number in the illustrated embodiments of FIGS. 1-11 and are uniformally angularly spaced from one another. They each comprise two holes 22 for screws and therebetween a hole 23 for a centering pin.

The other areas 25 which are retracted or set back relative to areas 21 and the transverse wall 18 are provided for securing the pressure plate 11 to the cover 10 as will be described below. Each of six areas 25 comprises a hole 24 in the illustrated embodiment and they angularly flank areas 21. But in practice for a given direction of rotation of the cover assembly in operation as designated by arrow F1 in FIG. 1, only three of the areas 25 are utilized. In particular, the areas 25 which for the direction of rotation are after or downstream of the corresponding areas 21. In case the cover assembly has to rotate in the opposite direction of rotation to that indicated by arrow F1 in FIG. 1, the other three areas 25 are used. Thus, a single cover 10, of symmetrical construction, advantageously may be used for cover assemblies adapted to rotate in either direction of rotation.

From one area 21 to another, surrounding the corresponding areas 25, the radial flange 20 of the cover 10 borders wide cutouts 26 in the transverse wall 19 of the cover 10. In alignment with each area 21, the lateral wall 19 has an opening 28 for taking part in the ventilation of the interior of the cover 10 and ejecting dust which may develop in the space by reason of the inevitable wear of the friction facings of the clutch plate 15.

For securement to the cover 10, the pressure plate 11 has radially extending lugs 29, three as shown, extending into notches 26 in the cover 10, in the middle of the notches 26 between two areas 25 of the radial flange 20 on the cover 10 and radially outside the lateral wall 19 of the cover.

Each of the radial lugs 29 on the pressure plate 11 is attached to an area 25 on the radial flange 20 of the cover 10 corresponding to the direction of rotation selected, by a series of straps 30 disposed transversely and chordally of the assembly and which are connected at their other ends by rivets 31 to a lug 29 on the pressure plate 11 and at their other ends by rivets 32 on the areas 25 on the radial flange 20 of the cover 10. The straps 30 comprise attachment means for connecting the pressure plate 11 for rotation with the cover 10 while permitting limited axial displacement of the pressure plate 11 relative to the cover 10. Also, the straps 30 which are prebent comprise spring return means for ensuring relative movement of the pressure plate 11 from the reaction plate 13 to disengage the clutch plate 15 when the clutch is declutched.

In the illustrated embodiments the axially acting resilient means urging the pressure plate 11 axially away from the cover 10 comprise a diaphragm spring 33 comprising a Belleville washer outer peripheral portion 34 and a central portion divided into radial fingers 35 separated by radial slots 36. The Belleville washer peripheral portion 34 bears against an annular bead 35 formed in the cover 10 and against axial bosses 37 formed at circumferentially spaced locations and axially protruding from the inner surface of the pressure plate 11, which faces toward the cover 10.

Mounting means rockably mount the diaphragm spring 33 on the cover 10. In the illustrated embodiment the mounting means comprise lugs 39 integrally formed with the cover 10 and extending through openings 40 formed at the bases of the slots 36 in the diaphragm spring 33. The lugs 39 have a radially outwardly bent portion extending around a stamped fulcrum ring 42 which bears against the radially bent portion 41. The fulcrum ring 42 has an annular bead 44 similar to and facing opposite the annular bead 35' in the cover 10. The beads 35' and 44 define the actual fulcrums for the diaphragm spring 33.

The peripheral portion 34 of the diaphragm spring 33 urges the pressure plate 11 axially in the direction of arrow F2 in FIG. 3 toward a position protruding outside the interior of the cover 10 for clamping the clutch plate 15 between the pressure plate 11 and the reaction plate 13 to maintain the clutch in its engaged position. The ends of the radial fingers 35 of the diaphragm spring 33 are adapted to come into operative contact with a release bearing (not shown) which acts in the direction indicated by arrow F2 in FIG. 3 which relieves the force applied to the pressure plate 11 thereby unclamping clutch plate 15 and disengaging the clutch.

In the illustrated embodiments there are provided at the inner periphery of the cover 10 between the lugs 39, radially inwardly extending abutment tabs 45 which are adapted to provide an axial abutment for the radial fingers 36 of the diaphragm spring 33 to limit the disengagement travel of the diaphragm spring 33 when the cover assembly is unloaded, that is, when the cover assembly is not mounted on the reaction plate 13.

Abutment means are also provided for axially retaining the pressure plate 11 after a predetermined axial travel of the pressure plate 11 relative to the cover 10 under the action of the diaphragm spring 33. The abutment means comprise at least one radial retaining lug 46 extending from the cover 10 and in the vicinity of the outer periphery of the cover 10, and also at least one transverse shoulder 47 on the pressure plate 11, adapted to cooperate with the retaining lug 46.

In the illustrated embodiment of FIGS. 1–5, there are three retaining lugs 46 provided generally in axial alignment with the areas 21 on the radial flange 20 of the cover 10 and generally in radial alignment with the holes 23 in the middle of the areas 21. Preferably, the retaining lugs 46 extend radially inside the lateral wall 19 of the cover 10 and are formed by the strikes for the openings 28 in the lateral wall 19 and therefore do not produce any additional or particular weakening of the cover 10.

In the embodiment of FIGS. 1–5, the transverse shoulders 47 of the pressure plate 11 cooperable with the retaining lugs 46 are defined by the outwardly turned transverse surface of the pressure plate, that is, the transverse surface which faces axially away from the cover.

Preferably, in association with each of the retaining lugs 46, the pressure plate 11 has along its edge a slot 48 which is in continuity with the associated retaining lug 46. In the embodiment of FIGS. 1–5, three such slots 48 are provided, each in practice consisting of an axial groove 49. As illustrated the axial grooves 49 are radially outwardly spaced from the axial bosses 37 on the pressure plate 11 and run along the main body of the pressure plate. Alternatively, the grooves 49 may cut radially into the bosses 37.

In any event, according to the invention, the slots 48 run along the outer peripheral edge of the pressure plate 11 and are in continuity with their associated transverse shoulders 47 cooperable with the retaining lugs 46.

In practice the axial grooves 49 of the slots 38 in the pressure plate in the embodiment of FIGS. 1–5 run through the edge of the main body of the pressure plate 11, and the axial grooves have a sufficient circumferential dimension to permit the passage of the retaining lugs 46 on the cover 10. Thereupon the axial grooves 48 permit, on assembly, the axial engagement of the pressure plate 11 into the interior of the cover 10, the pressure plate 11 being introduced in an angular orientation so that the grooves 49 face the retaining lugs 46. After such axial engagement the pressure plate 11 is rotated about the axis of the assembly a sufficient amount, as shown in FIG. 1, so that the axial grooves 49 are then circumferentially spaced from the retaining lugs 46.

In the unloaded condition, particularly in the course of storage or handling for assembling the clutch cover assembly on the reaction plate 13, the retaining lugs 46 serve as abutment means for the pressure plate 11 thereby ensuring its axial retention.

Obviously the arrangements are such that the clearance J1 between the retaining lugs 46 on the cover 10 and the outer transverse surface of the pressure plate 11 forming the transverse shoulders 47 is sufficient, bearing in mind the normal wear of the friction facings of the clutch plate 15, so that the pressure plate 11 never comes to bear against the retaining lugs 46 in the course of operation.

According to an advantage of the location of the abutment means 46, 47 at the outer periphery of the pressure plate 11, along the edge thereof, and as emphasized above, the axial abutment of the pressure plate 11 occurs along a circumference whose diameter is proximate to that of the circumference corresponding to the axially acting resilient means application, i.e., the circumference along which the diaphragm spring 33 bears against the pressure plate 11. This arrangement is particularly favorable from the viewpoint of axial retention of the pressure plate 11 and the stresses applied to the pressure plate.

Another advantage of the arrangement is to make the use of a shim for fixing the diaphraqm spring 33 in its flat position when the cover assembly is dismounted radially. Indeed, it is easy to insert such a shim between any one of the retaining lugs 46 and the corresponding shoulder 47. The advantage is common to all the embodiments of the invention.

In the embodiment illustrated in FIGS. 6 and 7, the lateral wall 19 of the cover 10 does not have the openings 28 as above, and the radial retaining lugs 46 provided on the cover 10 are axially offset relative to the areas 21 on the radial flange 20, and are formed by strikes provided for this purpose in the lateral wall 19 of the cover 10 between the areas 21 on the radial flange 20 and the transverse front wall 18.

In conjunction therewith for each radial retaining lug 46 the pressure plate 11 comprises facing the retaining lug 46, in the edge of the main body of the pressure plate, a slot 48 which comprises, as above, an axial groove 49 and also a circumferential groove 50, the grooves 49 and 50 intersecting each other.

In the embodiment of FIGS. 6 and 7, the axial groove 49 extends, as above, along the entire width of the main part of the pressure plate 11. Also, the circumferential groove 50 associated therewith extends circularly along the entire outer periphery of the pressure plate 11 and therefore is common to each of the axial grooves 49 in the pressure plate.

In this embodiment the forward flank of the circumferential groove 50, closest the transverse front wall 18 of the cover 10, comprises the transverse shoulder 47 associated with the retaining lugs 46 and in continuity with the slot 48.

An axial clearance J1 is provided, as in the preceding embodiment, between the forward flank of the circumferential groove 50 and the retaining lugs 46. Consequently axial clearance J2 is provided between the other flank of the circumferential groove 50 and the retaining lugs 46 to permit on clutch disengagement the disengagement travel of the pressure plate 11 necessary for unclamping the clutch plate 15 and also to limit this disengagement travel.

Also, as above, the pressure plate 11 may upon assembly, be inserted axially by displacing the axial grooves 49 along the retaining lugs 46 on the cover and when the circumferential groove 50 in the pressure plate 11 is in registration with the radial retaining lugs 46 by rotation of the pressure plate 11 about the axis of the assembly whereby the retaining lugs 46 are brought into engagement in the circumferential groove 50.

Alternatively, the pressure plate 11 may be tilted to permit engagement of at least one of the radial retaining lugs 46 in the circumferential groove 50, and then straightened out with engagement of the retaining lug 46 with the cover. The radial engagement is sufficiently great so that after straightening the pressure plate 11 it can then also be brought in engagement radially by the circumferential groove 50 onto the other retaining lugs 47 on the cover 10.

In any event, in the embodiment illustrated in FIGS. 6 and 7, the arrangement of the retaining lugs 46 offset inwardly of the cover 10 permits place savings in the radial direction for the clutch plate 15.

Further, the inner end or bottom 50' of the circumferential groove 50 may cooperate if necessary, particularly in case of rough handling of the unloaded cover assembly, with the terminal surface adjacent the retaining lugs 46 to limit the radial displacements of the pressure plate 11, thereby defining radial abutment means. The straps 30 are then protected against damage caused by excessive radial displacement of the pressure plate.

In the modified embodiment illustrated in FIG. 8 each axial groove 49 extends only part way through the pressure plate body, up to the circumferential groove 50 associated therewith. As in the previous embodiment the circumferential groove 50 may extend over the entire periphery of the pressure plate 11. Alternatively, as shown, the each axial groove 48 is associated with its own circumferential groove 50 which extends only over a limited circumferential segment of the periphery of the pressure plate 11.

In the latter case the terminal wall 48' of the circumferential groove 50 may cooperate with the corresponding retaining lug 46 to define a circumferential abutment adapted to limit the buckling of the straps 30 in case clutch is rotated in the direction opposite the normal direction of rotation.

In any event, as above, each axial groove 49 intersects its corresponding circumferential groove 50.

In the modified embodiments of FIGS. 9-11, each of the slots 48 in the pressure plate 11 is formed in a radially projecting boss 52 on the edge of body portion of the pressure plate 11 and not in the edge of the main body of the pressure plate as above. Corresponding bosses (not shown) are of course provided in the lateral wall of the cover 10 and have a rigidifying function as well.

In the embodiment of FIGS. 9 and 10, the slot 48 consists essentially of a circumferential groove 50. In the embodiment of FIG. 11 the slot 48 consists essentially of an axial groove 49.

The assembly and function of these embodiments are similar to those described in detail above.

Figure 12:
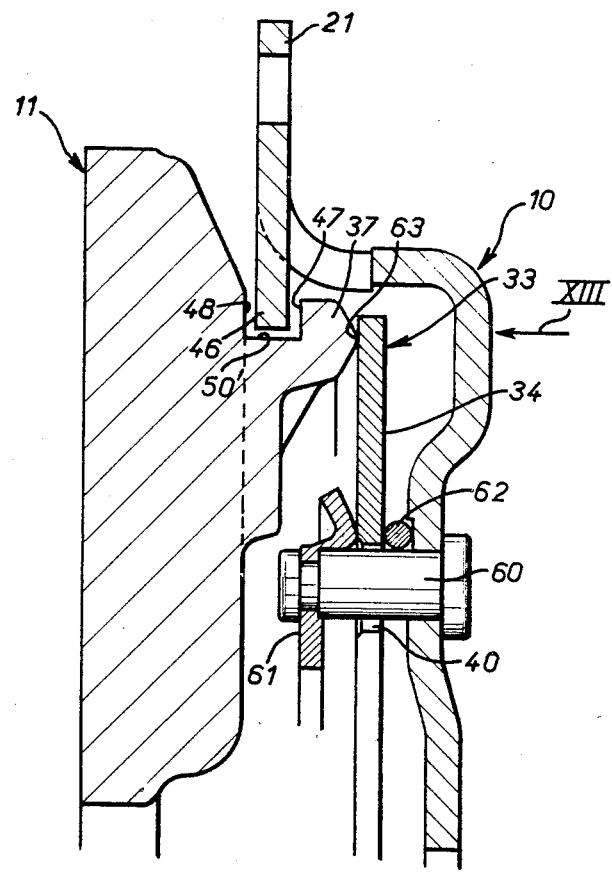
FIG. 12 is a view similar to that of FIG. 4 for an embodiment with a pot reaction plate.
Figure 13:
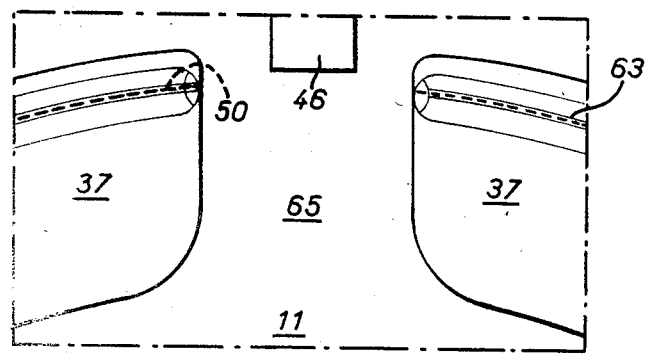
FIG. 13 is a schematic view taken in the direction of arrow XIII in FIG. 12.

In the embodiment of FIGS. 12 and 13, the reaction plate or flywheel is a pot type reaction plate, i.e., it comprises a forwardly extending cylindrical side wall (not shown) on which the cover is mounted. Accordingly, the mounting plane of the cover on the reaction plate is spaced axially forwardly of the reaction plate/clutch plate contact surface. In this embodiment the assembly means for rockably mounting the diaphragm spring 33 on the cover 10 comprises a plurality of rivets or posts 60 extending from the cover through the enlarged openings 40 of the slots in the diaphragm spring 33, a profiled fulcrum ring 61 on the remote side of the diaphragm spring 33 from the cover 10, and a toroidal fulcrum ring on the near side of the diaphragm spring 33 relative to the cover 10.

In this embodiment the slots 48 each comprise a circumferential groove 50 formed in the bosses 37 against which the peripheral portion 34 of the diaphragm spring 33 is applied. In practice the circumferential groove 50 extends over the entire periphery of the pressure plate. Alternatively there may be a plurality of circumferential grooves each for a corresponding retaining lug 46. In this case an end of each of the circumferential grooves 50 comprises a circumferential abutment with the corresponding retaining lug 46 for limiting the buckling of the straps when the clutch rotates in the direction opposite the normal direction of rotation.

In addition the retaining lugs 46 are formed by the continuation of the radial flange on the cover 10. The inner ends of the retaining lugs 46 are tangent to a circumference having a diameter substantially equal to that of the outer periphery of the diaphragm spring. When the diameter is greater the positioning of the diaphragm spring in the course of assembly is effected by translation. When the diameter is smaller the positioning of the diaphragm spring is effected by tilting and then straightening the diaphragm spring. In either case, as above, the ends of the retaining lugs 46 cooperable with the shoulders 47 are generally situated on the same circumference as the contact zone 63 of the axial bosses 37 corresponding to the bearing diameter of the diaphragm spring 33 on the pressure plate 11.

In this embodiment as above the inner end or bottom 50' of the circumferential groove 50 is adapted to cooperate with the terminal parts of the retaining lugs 46 to limit the radial movement of the pressure plate 11 when handling the unloaded cover assembly without any particular precaution.

Further, in this embodiment advantage is taken of spaces 65 between circumferential ends of the bosses 37 on the pressure plate 11 which define transverse grooves for mounting the pressure plate 11. The pressure plate may be mounted by axial engagement of the retaining lugs 46 into the spaces 65, then the circumferential grooves 50 come into registration with the retaining lugs 46 to permit rotation of the pressure plate 11. Alternatively, assembly can be accomplished by tilting the pressure plate 11 and then straightening it while radially engaging the retaining lugs 46 into the circumferential grooves 50.

The present invention is moreover not limited to the various illustrated and described embodiments but encompasses all modifications and alternatives which will be understood to those skilled in the art without departing from the scope of the present invention.

Thus, although only push type clutches have been considered in the foregoing description the application is equally applicable to other types of clutches, namely pull type clutches.

Moreover, the axially acting resilient means instead of defined by a diaphragm spring may comprise coil springs and/or the attachment means defined by chordal straps may be replaced by radial straps, etc.

In any event, the transverse shoulder(s) on the pressure plate cooperable with the retaining lug(s) may, as described above, be located on the outer or rear surface of the main body of the pressure plate, which faces the reaction plate, between the inner and outer surfaces of the main body of the pressure plate or between the inner surface of the main body of the pressure plate and the contact zone with the associated axially acting resilient means.

What is claimed is:

1. A clutch cover assembly comprising a cover, a pressure plate, said pressure plate having a main body, an axial boss formed on an axially inner surface of said main body facing said clutch cover, straps connecting said pressure plate to said cover for rotation of said pressure plate with said cover while permitting limited axial travel of said pressure plate relative to said cover, axially acting resilient means bearing against said cover and applied against said axial boss on said pressure plate to urge said pressure plate axially away from said cover, abutment means for axially retaining said pressure plate after a predetermined axial travel of said pressure plate relative to said cover, said main body of said pressure plate substantially protruding axially beyond said abutment means away from said axially acting resilient means, said abutment means including at least one radially extending retaining lug provided on said cover and at least one transverse shoulder on said pressure plate cooperable with said retaining lug, said transverse shoulder being in continuity with a slot in said axial boss on said pressure plate, said slot being formed in a peripheral edge of said axial boss for accomodating said retaining lug to retain said pressure plate inside said cover, said axially acting resilient means contacting said axial boss along a circumference of said cover assembly proximate to a circumference along which said retaining lug contacts said transverse shoulder, and said slot being a radially outwardly opening circumferentially extending groove having a radially inner end wall which is cooperable with the terminal part of said retaining lug to limit radial displacement of said pressure plate relative to said cover for protecting said straps against damage caused by excessive radial displacement of the pressure plate.

2. The cover assembly of claim 1 wherein said bead is circumferentially interrupted a circumferential distance at least equal to the width of a respective lug wherein said groove is interrupted for each of said lugs to provide a groove open end for circumferentially receiving each of said lugs.

3. The cover assembly of claim 1, wherein said cover has a radial flange and said retaining lug being a radial inward continuation of said radial flange, said main body of said pressure plate protruding substantially axially beyond said radial flange away from said axially acting resilient means.

4. The cover assembly of claim 3, said axially acting resilient means comprising a diaphragm spring, and radially inner end of each retaining lug being tangent to a circumference substantially equal to the circumference of an outer periphery of said diaphragm spring.

* * * * *